US008849705B2

(12) United States Patent
Khan et al.

(10) Patent No.: US 8,849,705 B2
(45) Date of Patent: Sep. 30, 2014

(54) METHODS, SYSTEMS, AND COMPUTER READABLE MEDIA FOR FACILITATING USE OF WIRELESS SMART DEVICES TO PURCHASE GOODS SERVICES

(75) Inventors: Mohammad Khan, San Jose, CA (US); Pradeep Kumar, Fremont, CA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 12/917,191

(22) Filed: Nov. 1, 2010

(65) Prior Publication Data

US 2011/0106635 A1 May 5, 2011

Related U.S. Application Data

(60) Provisional application No. 61/256,651, filed on Oct. 30, 2009.

(51) Int. Cl.
| | |
|---|---|
| *G06Q 30/00* | (2012.01) |
| *H04M 15/00* | (2006.01) |
| *H04W 4/24* | (2009.01) |
| *G06Q 30/06* | (2012.01) |
| *G06Q 20/32* | (2012.01) |
| *G06Q 30/02* | (2012.01) |
| *G06Q 20/12* | (2012.01) |

(52) U.S. Cl.
CPC ............... *G06Q 20/12* (2013.01); *H04M 15/68* (2013.01); *H04W 4/24* (2013.01); *H04M 15/00* (2013.01); *G06Q 30/0603* (2013.01); *G06Q 20/32* (2013.01); *G06Q 30/0277* (2013.01); *G06Q 20/322* (2013.01)
USPC ......................................................... 705/26.1

(58) Field of Classification Search
USPC .................................................. 705/26–27.2
See application file for complete search history.

(56) References Cited

U.S. PATENT DOCUMENTS

2004/0054591 A1   3/2004 Spaeth et al.
2005/0256781 A1*  11/2005 Sands et al. ..................... 705/26

(Continued)

FOREIGN PATENT DOCUMENTS

KR   10-2008-0097187 A   9/2006
KR   10-2008-0021436 A   3/2008

(Continued)

OTHER PUBLICATIONS

Reportlinker Adds Mobile Coupons & NFC Smart Posters: Strategies, Applications & Forecasts 2009-2014 (PR Newswire Nov. 20, 2009).*

(Continued)

*Primary Examiner* — Ethan D Civan
(74) *Attorney, Agent, or Firm* — Jenkins, Wilson, Taylor & Hunt, P.A.

(57) ABSTRACT

Methods, systems, and computer readable media for facilitating the use of wireless smart devices to purchase goods or services that are not available at a purchaser's location are provided. According to one aspect of the subject matter described herein, a method for facilitating the use of a wireless smart device to purchase goods or services is provided. The method includes providing a smart poster that advertises a good or service and is locatable in an area that is accessible by a potential purchaser of a good or service. The method includes directing, using a mechanism in or on the smart poster, the wireless smart device to access a section of an merchant's website specific to the good or service in response to the wireless smart device interfacing with the smart poster. The method further includes providing, via the wireless smart device, an option for the potential purchaser to purchase the good or service in a manner that bypasses a payment register in a retail location of the merchant.

22 Claims, 3 Drawing Sheets

(56) References Cited

U.S. PATENT DOCUMENTS

| | | |
|---|---|---|
| 2007/0016479 A1 | 1/2007 | Lauper |
| 2007/0224979 A1 | 9/2007 | O'Neal et al. |
| 2008/0114884 A1 | 5/2008 | Hewes et al. |
| 2008/0262929 A1 | 10/2008 | Behr |
| 2009/0144161 A1* | 6/2009 | Fisher .............................. 705/16 |
| 2009/0170483 A1* | 7/2009 | Barnett et al. ............. 455/414.2 |
| 2009/0192912 A1 | 7/2009 | Griffin et al. |
| 2009/0193500 A1 | 7/2009 | Griffin et al. |
| 2010/0161410 A1 | 6/2010 | Tulloch |
| 2011/0082746 A1 | 4/2011 | Rice et al. |
| 2011/0264490 A1 | 10/2011 | Durvasula et al. |
| 2011/0320293 A1 | 12/2011 | Khan |

FOREIGN PATENT DOCUMENTS

| | | |
|---|---|---|
| WO | WO 2006/055721 A2 | 5/2006 |
| WO | WO 2007/026982 A1 | 3/2007 |
| WO | WO 2008/028555 A2 | 3/2008 |
| WO | WO 2011/150369 A2 | 12/2011 |
| WO | WO 2012/006098 A2 | 1/2012 |

OTHER PUBLICATIONS

Commonly Assigned, Co-pending U.S. Appl. No. 13/171,128 for "Methods, Systems, and Computer Readable Media for Facilitating In-Store or Near-Store Ordering and Payment of Goods and Services Through a Single-Tap of Near Field Communication (NEC) Device," (filed Jun. 28, 2011).

Notification of Transmittal of the International Search Report and the Written Opinion of the International Searching Authority, or the Declaration for International Application No. PCT/US2010/054978 (Jun. 24, 2011).

Non-Final Office Action for U.S. Appl. No. 13/171,128 (Mar. 1, 2013).

Communication of European Publication Number and Information on the Application of Article 67(3) EPC for European Patent Application No. 10827606.4 (Aug. 8, 2012).

Communication of European Publication Number and Information on the Application of Article 67(3) EPC for European Patent Application No. 10827608.4 (Aug. 8, 20120).

Final Office Action for U.S. Appl. No. 13/171,128 (Oct. 23, 2013).

Communication of European Publication Number and Information on the Application of Article 67(3) EPC for European Patent Application No. 11804135.9 (Apr. 4, 2013).

Final Office Action for U.S. Appl. No. 13/118,046 (Oct. 2, 2013).

Communication of European Publication Number and Information on the Application of Article 67(3) EPC for European Patent Application No. 11787521.1 (Mar. 13, 2013).

Non-Final Official Action for U.S. Appl. No. 13/118,046 (Oct. 3, 2012).

Notification of Transmittal of the International Search Report and the Written Opinion of the International Searching Authority, or the Declaration for International Application No. PCT/US2011/038408 (Feb. 29, 2012).

* cited by examiner

METHODS, SYSTEMS, AND COMPUTER READABLE MEDIA FOR FACILITATING USE OF WIRELESS SMART DEVICES TO PURCHASE GOODS SERVICES

RELATED APPLICATIONS

The present application claims the benefit of U.S. Provisional Patent Application Ser. No. 61/256,651, filed Oct. 30, 2009, the disclosure of which is incorporated herein by reference in its entirety.

TECHNICAL FIELD

The subject matter described herein relates to wireless smart devices. More particularly, the subject matter described herein relates to methods, systems, and computer readable media for facilitating the use of wireless smart devices to purchase goods or services.

BACKGROUND

Wireless smart devices, such as near field communications or NFC devices, are becoming more prevalent in society as a replacement for conventional magnetic stripe cards. NFC devices communicate wirelessly with an NFC reader positioned at a point of sale (PoS) location to purchase goods or services that are available at retail locations. For example, NFC devices can be used to purchase gasoline at gasoline pumps, to purchase refreshments at movie theaters, and to purchase groceries at grocery stores.

One advantage of NFC devices over conventional magnetic stripe cards is that NFC devices are often integrated within other devices, such as mobile telephones, that have additional hardware and software that may facilitate the obtaining of product information or the making of a purchase transaction. For example, NFC devices can be integrated within mobile telephones, including smart phones, with hardware and software capable of performing purchase and information retrieval actions. In contrast, conventional magnetic stripe cards only provide the track 1 and track 2 data when read by a magnetic stripe reader and are incapable of obtaining additional information about a product or service or of directing a user to alternate purchase channels.

One particular instance in which it may be desirable to use the enhanced capabilities of an NFC-enabled device is when a product or service is not in inventory of a retail establishment or is not otherwise available at the potential purchaser's location. For example, a potential purchaser in a clothing store may desire to purchase a garment of a size that is not currently in inventory of the clothing store. Using a conventional magnetic stripe card, the user is required to either manually purchase the garment from another store or to manually make a purchase via the merchant's web site.

In another example, free standing advertising displays exist in malls to promote products or services of different retailers. However, like the case when the product or service is not in a store's inventory, the product or service being advertised is not typically available at the free standing display, and the purchaser is required to manually purchase the advertised goods or services from another source, such as a retail store or website. Because the goods or services are not immediately available, the likelihood that the purchaser will actually purchase the goods or services is decreased.

Accordingly, there exists a long felt need for methods, systems, and computer readable media for facilitating the use of wireless smart devices to purchase goods or services.

SUMMARY

Methods, systems, and computer readable media for facilitating the use of wireless smart devices to purchase goods or services that are not available at a purchaser's location are provided. According to one aspect of the subject matter described herein, a method for facilitating the use of a wireless smart device to purchase goods or services is provided. The method includes providing a smart poster that advertises a good or service and is locatable in an area that is accessible by a potential purchaser of a good or service. The method includes directing, using a mechanism in or on the smart poster, the wireless smart device to access a section of an merchant's website specific to the good or service in response to the wireless smart device interfacing with the smart poster. The method further includes providing, via the wireless smart device, an option for the potential purchaser to purchase the good or service in a manner that bypasses a payment register in a retail location of the merchant.

The subject matter described herein for facilitating the use of wireless smart devices to purchase goods or services may be implemented in hardware, in combination with software and firmware. As such, the terms "function" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, of which.

DETAILED DESCRIPTION

The present subject matter describes various methods, systems, and computer readable media that may be utilized to facilitate the use of a wireless smart device to purchase goods or services without the need for a sales agent and/or a payment register. The present subject matter may be used in scenarios where desired products are not available in proper size or color or in desired characteristics at a seller physical store location or seller's representative locations where purchaser is currently shopping. The present subject matter may provide a potential purchaser a means to purchase the product through seller's online store visible through the display of the purchaser's mobile handset communicating through any wireless means of communication, such as 3G, GSM, GPRS, WiFi, WiMax, and other remote local or remote wireless communication. Alternatively, the present subject matter may also be advantageously utilized when the desired product is located at the purchaser's location (e.g., the product is located in-store as inventory or as a demo product) by allowing the purchaser a convenient means to purchase the desired good or service in a manner that bypasses or obviates the need for a payment register in a retail location of the merchant (e.g., without having to present the product or payment at a point of sale register such that interaction with a sales clerk is unnecessary).

Figure 1:
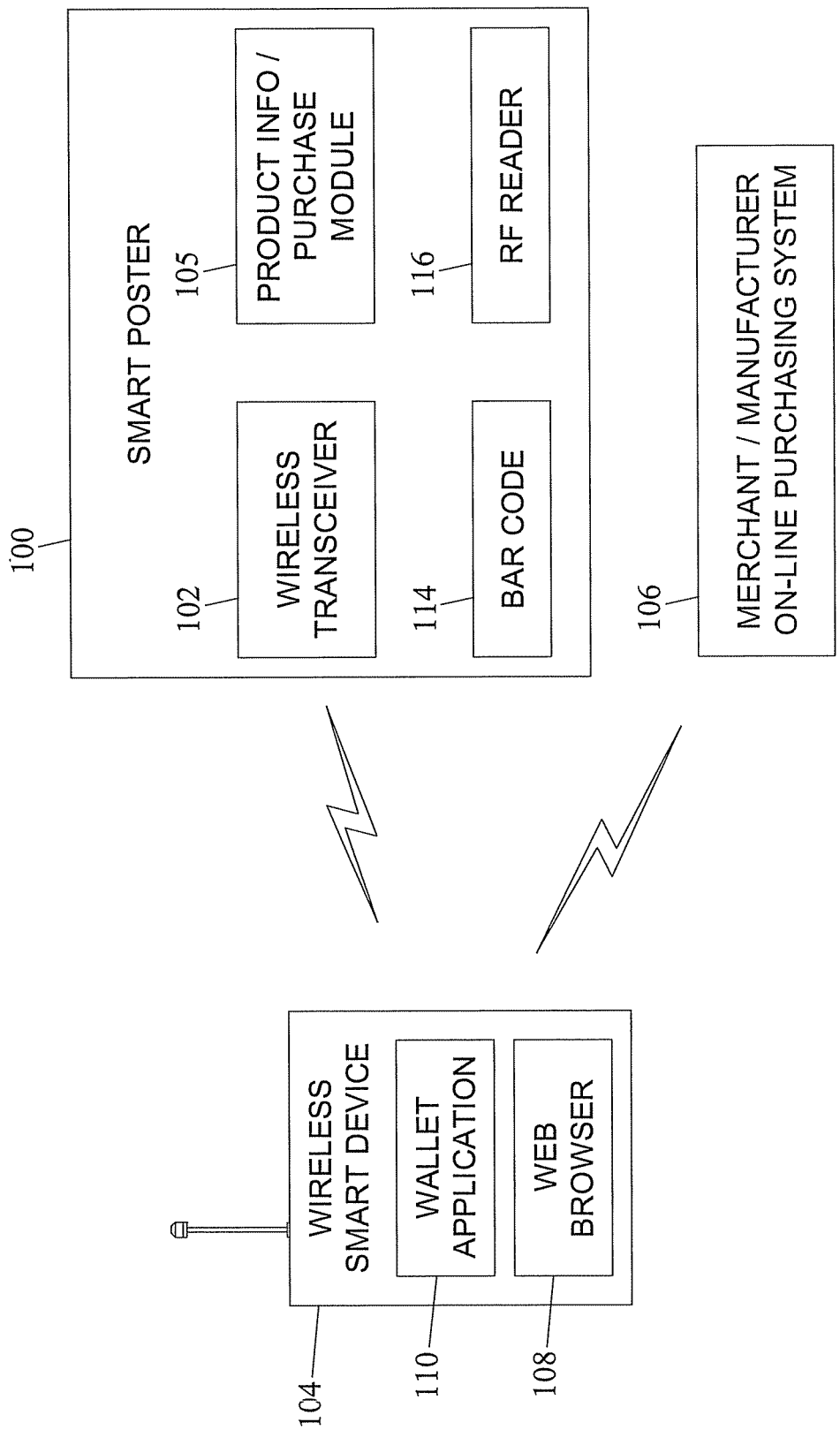
FIG. 1 is a block diagram illustrating an exemplary system for facilitating the use of wireless smart devices to purchase goods or services according to an embodiment described herein.

FIG. 1 is a block diagram illustrating an exemplary system for facilitating the use of wireless smart devices to purchase products or services according to an embodiment described herein. Referring to FIG. 1, one exemplary system includes a smart poster 100 with mechanism, such as a wireless transceiver 102, that communicates with a wireless smart device 104 to allow wireless smart device 104 to obtain information regarding and purchase products not available at a purchaser's location. In one embodiment, wireless smart device 104 may be a near field communications (NFC) enabled mobile device or a smart phone equipped with a camera, barcode reader and/or barcode reading application. The camera or barcode reader application may then be used to capture or scan a barcode 114 on smart poster 100. The barcode reading application is then used to process the captured/scanned barcode image.

Smart poster 100 may be any suitable two or three dimensional object that is locatable in any public place that is accessible by purchasers of goods or services. In one example, smart poster 100 may advertise a good or service. In one embodiment, smart poster 100 may instead be a shelf tag, a product tag, a product rack, or a product label. Wireless transceiver 102 may communicate wirelessly with wireless smart device 104. In one embodiment, wireless transceiver 102 is a passive NEC or RF tag device that is powered by an interfacing wireless smart device 104. For example, after an NFC enabled wireless smart device 104 is tapped or brought in close proximity with wireless transceiver 102, wireless transceiver 102 is activated by obtaining power from the electromagnetic field generated by wireless smart device 104.

Wireless transceiver 102 may also include an NEC or RF antenna and a processor that executes a product information/purchase module 105 to direct wireless smart device 104 to information (e.g., a website) regarding products or services that are not available at the purchaser's location. In one example, wireless transceiver 102 may communicate via NFC the URL, Internet protocol (IP) address, or identification number associated with a merchant/manufacturer online purchasing system 106 to a web browser 108 that executes on wireless smart device 104. Smart poster 100 may also optionally include an active RF reader 116 that is equipped with its own power source. Notably, RF reader 116 is an active device that is capable of generating its own electromagnetic field to communicate the URL, IP address, or identification number associated with the merchant system 106.

If a product or service is not available at the purchaser's location, the purchaser may obtain, via web browser 108 or through phone based applications, the information regarding the product or service, browse product sizes, colors, or other options, read customer reviews, and the like from system 106.

In one embodiment, the wireless connection between wireless smart device 104 and merchant/manufacturer online purchasing system 106 may be established via a 3G network, 4G network, WiFi network, a global system for mobile communications (GSM) network, a general packet radio service (GPRS) network, a WiMax network, or any other similar wireless network that is configured to transfer data.

After making a product and/or option selection, the purchaser may then purchase the good or service and pay for the purchase using a payment device present in a midlet or wallet software application 110 in wireless smart device 104. In one embodiment, the payment device may include an electronic softcard (e.g., an electronic credit card, prepaid card, loyalty card, gift card, debit card, check card, or the like). Wallet application 110 may also be used to store user information, such as addresses used for shipping and billing, personal information, such as purchasing/ordering preferences and others, and/or an electronic receipt for the transaction. Although wallet application 110 may be stored in a secure memory element in wireless smart device 104, wallet application 110 and other like software applications/modules may also be kept in non-secure baseband memory without departing from the scope of the present subject matter.

In one example, smart poster 100 may be located in a brick and mortar retail establishment, such as a clothing store. A user may desire to purchase a pair of jeans for which the size is not available in the clothing store, but may be available in a warehouse or any other offsite location. The user may then tap the user's wireless smart device 104 on smart poster 100, which may advertise the brand of jeans that the user desires to purchase and which may be located in the jeans department of the clothing store.

In one embodiment, wireless transceiver 102 may direct the user to the jeans section of merchant/manufacturer online purchasing system 106 where the user selects the desired size and pays using wallet application 110. For example, wireless transceiver 102 provides a URL, IP address, or a corresponding identification number of the merchant's website (supported by system 106) that displays the desired product to the wireless smart device 104. Upon receiving the URL, IP address, or the corresponding identification number associated with the merchant website, wireless smart device 104 may initiate web browser 108 directly or indirectly, which in turn uses the URL to access and display the associated webpage. In an alternate embodiment, wireless smart device 104 may initiate wallet application 110 upon receiving the URL or identification number. Wallet application 110 may then use the URL to communicate with system 106 in order to obtain and display information (e.g., price, sizes, colors, etc.) about the desired product. Notably, the use of the wallet application may present a more dynamic and enriched environment, which may not be possible with a static website, for the user. Although displayed differently, this information is not unlike the web page content obtained by web browser 108 from system 106.

If the wireless transceiver provides an identification number associated with the merchant/manufacturer online purchasing system 106 instead of a URL or IP address, wallet application 110 is configured to contact a specialized server (e.g., an mTrigger management server or an mContent Manager server) that can access a database that maps identification numbers and merchant/manufacturer online purchasing systems or websites (e.g., merchant/manufacturer online purchasing system 106). The specialized server may then provide wireless smart device 104 with a URL or IP address, which may then be used to contact the merchant system 106.

After acquiring and viewing the product information displayed on wireless smart device 104, the user may decide to conduct a purchase transaction for the desired product. In one embodiment, the user may designate the desired quantity, size, and color of the product via web browser 108 or wallet application 110 and select an option to conduct the purchase transaction. After the option is selected, the purchase transaction may be made with an electronic payment softcard residing in wallet application 110. Alternatively, the purchase transaction may be made with a payment card information/number stored in the merchant's backend system (e.g., a credit card number associated with the user's account stored in merchant system 106). Notably, the purchase for the desired product is conducted in a manner that bypasses (or obviates the need for) a payment register in a retail location of the merchant (e.g., without interacting sales clerk and/or without the use a payment register or point of sale terminal).

In addition to payment information, other types of information may be utilized during or after the purchase transaction. For example, wireless transceiver 102 or merchant system 106 (via a merchant web site) may also provide the user with an electronic coupon that provides a discount for the item to be purchased. In another example, wireless smart device 104 may use a pre-stored coupon that the purchaser obtained from another source that may be applied upon purchasing the desired product. In another embodiment, the merchant system 106 may be configured to suggest or present a product that is similar to the desired product, or a complementary product (e.g., an accessory to the desired product), or another product offered by the merchant or manufacturer based on the user's profile and/or past product viewings or purchases. Similarly, merchant system 106 may also be configured to send smart device 104 an electronic coupon or offer that is related to the above mentioned complementary product or suggested product.

Likewise, the user's billing, shipping, and payment information may be pre-stored in wallet application 110 and used to facilitate the transaction. Therefore, after conducting the purchase transaction, wallet client 110 may communicate the stored shipping address to merchant system 106. Alternatively, the user may enter billing and shipping information manually.

In another example, smart poster 100 may be a stand alone poster in a mall that advertises a retailer or manufacturer's goods or services. A user may bring wireless smart device 104 in proximity to wireless transceiver 102 to obtain further information about the product or service and/or to make a purchase transaction. The purchase transaction may be completed using wallet application 110 as described in the previous example.

Figure 2:
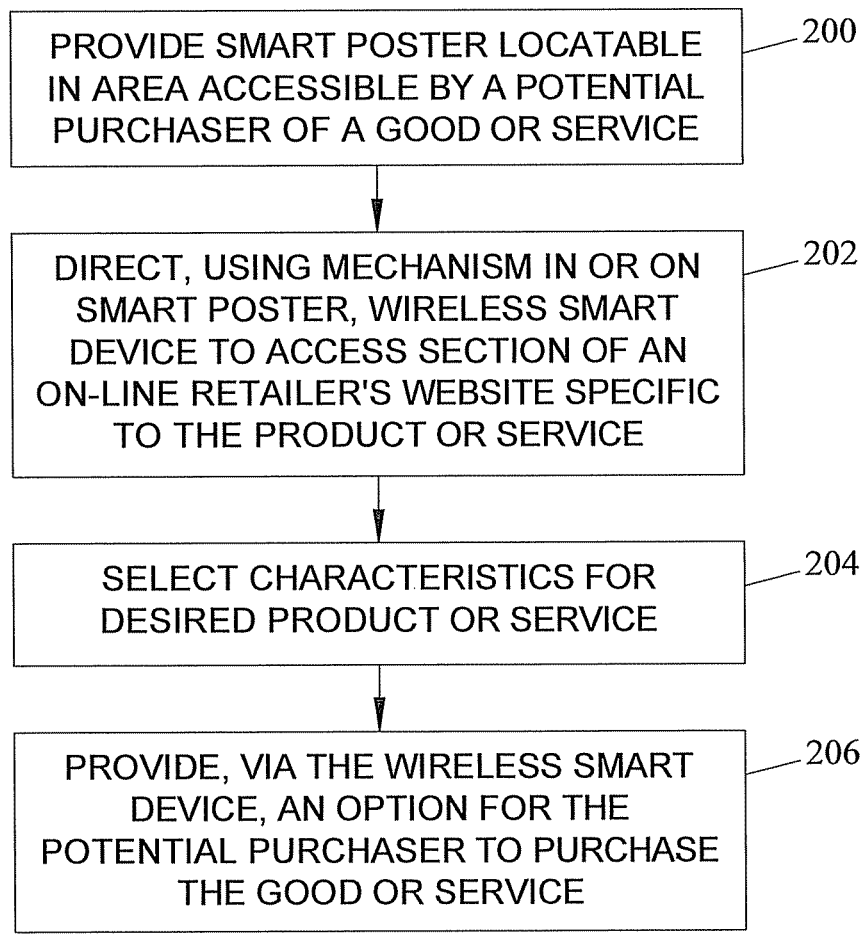
FIG. 2 is a flow chart illustrating an exemplary process for facilitating the use of wireless smart devices to purchase goods or services that are according to an embodiment described herein.

FIG. 2 is a flow chart illustrating an exemplary process for facilitating the use of wireless smart devices to purchase goods or services according to an embodiment of the subject matter described herein. Referring to FIG. 2, in step 200, a smart poster that is locatable in an area accessible by a potential purchaser of a good or service is provided. As stated above with regard to FIG. 1, smart poster 100 may be locatable in a retail location, such as a retail store or in a shopping mall. Alternatively, smart poster 100 may be accessible to a user at an area located outside or away from a retail location. In one embodiment, smart poster 100 may be located in any public place. For example, a smart poster selling a DVD could be located in a bus station or airport.

In block 202, wireless smart device 104 is directed, using a mechanism in or on smart poster 100, to access a section of a merchant's or on-line retailer's website specific to the good or service. The website may be supported by backend merchant online purchasing system 106. For example, wireless transceiver 102 and product/information purchase module 105 may communicate information (e.g., a URL or IP address or identification number) to wireless smart device 104 for accessing a good or service specific portion of an on-line retailer's or merchant or service provider website. In one embodiment, either web browser 108 or wallet application 110 may be used to access or display the online product information/content.

In block 204, the user may use wireless smart device 104 to select or designate one or more characteristics corresponding to the desired good, such as a quantity, color, size, or the like. In one embodiment, one or more of these characteristics is associated with the specific URL or IP address provided by smart poster 100. For example, each different size and/or color of the desired product may each be associated with a unique URL, smart poster, or shelf tag.

In block 206, an option is provided via the wireless smart device for the potential purchaser to purchase the good or service. For example, as described above, wireless transceiver 102 may direct web browser 108 or wallet application 110 on wireless smart device 104 to a section of merchant/manufacturer online purchasing system 106 to purchase a good or service. The wallet application or the web browser may then use the data obtained from system 106 to display an on-line store purchasing interface on the screen of wireless smart device 104. A user may then use this interface to select an option to purchase the good or service. Notably, user may utilize this interface to purchase the desired good or service in a manner that bypasses (or obviates the need for) a payment register in a retail location of the merchant (e.g., without having to interact with a sales agent or without the use of a payment register or cashier). Wallet application 110 may be preloaded with one or more electronic soft cards (such as an electronic credit, debit, check, prepaid or payment or non-payment card). Wallet application 110 may also be preloaded with user information such as addresses used for shipping and billing, personal information such as preferences and others that allows the user to complete the purchase transaction without the use of a payment register.

Figure 3:
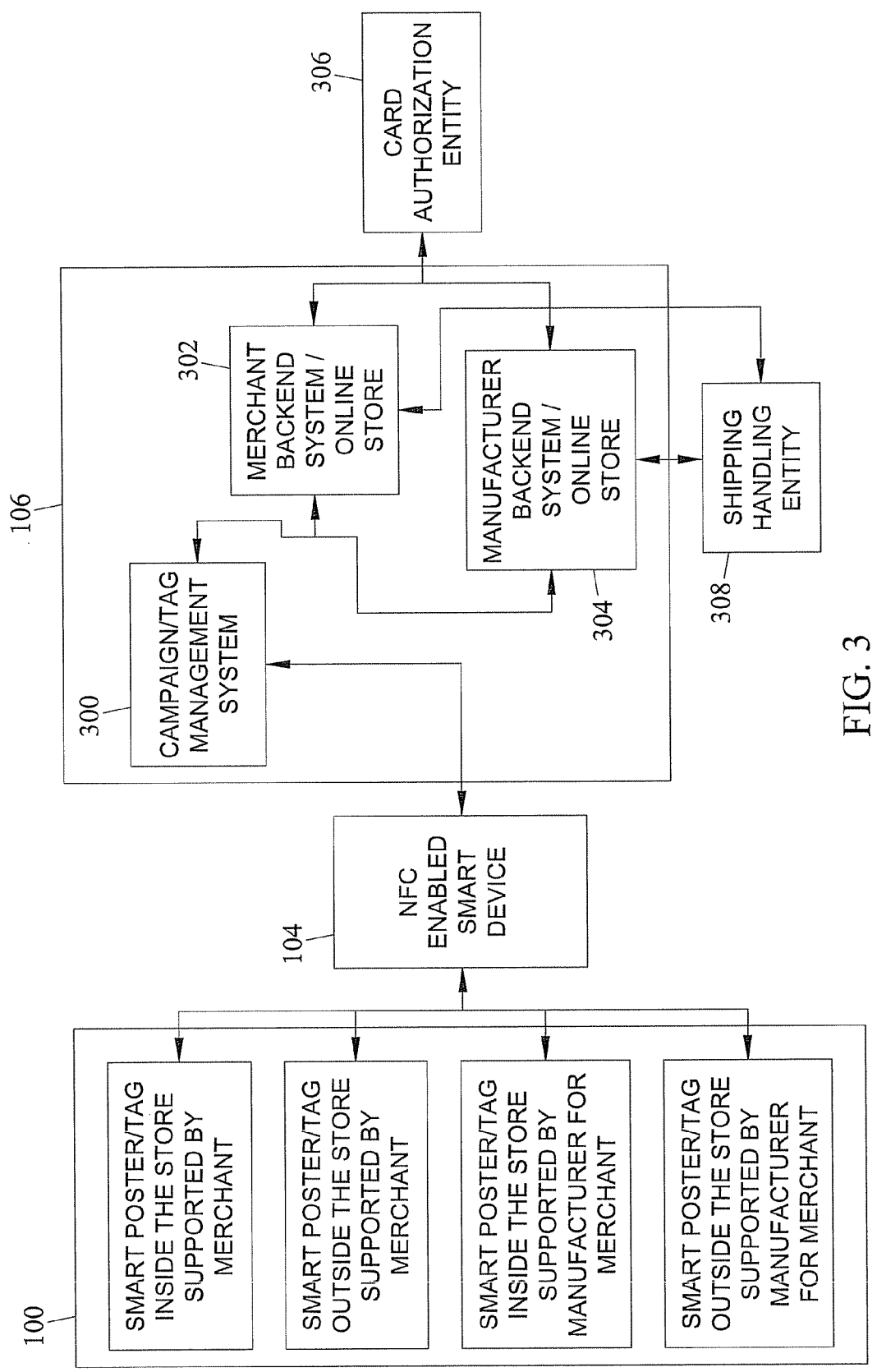
FIG. 3 is a block diagram is illustrating a system for facilitating the use of NFC devices for purchasing goods or services according to an embodiment of the subject matter described herein.

FIG. 3 is a block diagram illustrating a system for facilitating the use of NEC devices for purchasing goods or services according to an embodiment of the subject matter described herein. Referring to FIG. 3, smart poster 100 can be located inside a store supported by a merchant, a smart poster outside of a store supported by a merchant, a smart poster inside a store supported by a manufacturer for a merchant, or a smart poster outside a store supported by a manufacturer for a merchant. Merchant/manufacturer online purchasing system 106 may include a campaign/tag management system 300 that manages NEC devices or tags, a merchant backend system or online store 302 that allows purchasers to browse and purchase goods or services offered by a merchant, a manufacturer backend system or online store 304 that allows purchaser to browse and purchase goods or services offered by the manufacturer. Merchant/manufacturer online purchasing system 106 may also interact with a card authorization entity 306 that authorizes credit or debit card transactions. In one embodiment, system 106 may interact with card authority 306 to authenticate and authorize electronic soft cards accessed by wallet application 110 for the purchase transaction. System 106 may also interact with a shipping handling entity 308 that handles the shipping of goods or services to a purchaser's location. For example, system 106 may obtain shipping information from wallet application 110 during the purchase transaction and forward the information to shipping handling entity 308.

In the examples described above, purchase transactions using NFC-enabled user devices are described. In alternate examples, purchase transactions using other interactive wireless technologies, such as radio frequency (RF) or barcode (e.g., UPC tags) enabled devices may be facilitated. In addition, the type of device with the integrated smart technology is not limited to mobile phones. The term, "wireless smart device," as used herein is intended to refer to any device with NFC, RF communication, or barcode capturing capabilities to interact with a smart poster with the corresponding technology. For example, a wireless smart device with RF transceiver capabilities may interact with an RF-enabled smart poster to contact a merchant or manufacturer web site and purchase a good or service not available at a purchaser's location. Similarly, a barcode-enabled wireless smart device may include a camera that is used to scan or capture a barcode on a smart poster. The barcode may include information which directs the web browser on the device to the product-specific portion merchant or manufacturer's web site to purchase a good or service not available at a purchaser's location. An application on the wireless smart device may read the barcode captured by the camera and extract the encoded information for directing the wireless smart device to the section of the merchant's or on-line retailer's website. For example, such an application may be configured to read one- or two-dimensional barcodes from jpeg or other image data captured by the camera.

As mentioned above, although the present specification describes scenarios where goods or services are not located at the purchaser's location, the present subject matter may also be implemented when the desired product is present at the purchaser's location in certain scenarios. For example, the present subject matter may be utilized by a customer or merchant for the sake of convenience even if the desired product is physically located at the store. Namely, the customer may simply desire to use the present subject matter if the customer requires a prompt purchase transaction without paying for the goods at a payment terminal/register manned by a sales clerk (e.g., avoid waiting in line at the cashier) or wishes the product to be mailed to a designated shipping address (e.g., the customer has other shopping destinations and does not wish to carry the product around or does not want to transport the product home). In scenarios such as these, the purchaser simply needs to tap wireless smart device 104 to the product tag or smart poster in order to obtain URL information related to the merchant system 106. The merchant system 106 then provides the wireless smart device 104 with information associated with the product (e.g., via on-line store website) and the purchaser makes his product and option selections. Once the purchaser makes his purchase as described above, merchant system 106 may send an electronic payment receipt (e.g., via email or an electronic download via 3G, 4G, WiFi, etc.) to wireless smart device 104 and/or to the merchant store visited by the purchaser. Since a legal purchase has been made, the purchaser may carry the purchased product from the store premises. Depending on the merchant location, this scenario may also require the purchaser to present a store clerk his electronic receipt by showing the screen display of device 104. Alternatively, the store clerk may view the electronic receipt on the store's computer display by either receiving the electronic receipt directly from system 106 or by having the customer tap device 104 to an electronic reader configured to acquire a copy of the customer's electronic receipt. In either situation, the purchaser has avoided the need to wait in line for a cashier or checkout clerk.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for facilitating the use of wireless smart devices to purchase goods or services, the method comprising:
   at a retail location associated with a merchant that includes a point of sale terminal and a smart poster that advertises a good or service:
      initiating a purchase transaction of the good or service by interfacing a wireless smart device with the smart poster using near field communications (NFC), wherein the wireless smart device receives an identification number from the smart poster via the NFC, wherein the smart poster is located in an area of the retail location that is accessible by a potential purchaser of the good or service;
      directing, using a mechanism in or on the smart poster, the wireless smart device to utilize the identification number obtained from the smart poster to access a section of the merchant's website specific to the good or service in response to the wireless smart device interfacing with the smart poster; and
   conducting, via the wireless smart device, the purchase transaction of the good or service at the retail location in a manner that bypasses the point of sale terminal at the retail location, wherein conducting the purchase transaction includes providing electronic payment information that is pre-stored in the wireless smart device to an on-line purchasing system associated with the retail location.

2. The method of claim 1 wherein the smart poster is located in a retail establishment.

3. The method of claim 1 wherein the smart poster is located outside of a retail establishment.

4. The method of claim 1 wherein providing the option for the potential purchaser to purchase the good or service includes allowing the potential purchaser to complete the purchase using a wallet application.

5. The method of claim 4 wherein allowing the potential purchaser to complete the purchase using the wallet application includes allowing the potential purchaser to pay for the good or service using a pre-stored soft card accessible via the wallet application.

6. The method of claim 1 wherein the wireless smart device comprises a near field communications (NFC) enabled user device and wherein the mechanism in or on the smart poster includes an NFC transceiver and a product information/purchase module for communicating information to the wireless smart device via near field communications for directing the wireless smart device to the section of the merchant's website specific to the good or service.

7. The method of claim 1 wherein the wireless smart device comprises a radio frequency (RF) enabled user device and wherein the mechanism in or on the smart poster includes an RF transceiver and a product information/purchase module for communicating information to the wireless smart device via near field communications for directing the wireless smart device to the section of the merchant's website specific to the good or service.

8. The method of claim 1 wherein the smart poster enables purchase of the good or service when the good or service is not available for purchase at the purchaser's current location.

9. The method of claim 1 wherein directing the wireless smart device includes providing at least one of a URL, Internet protocol (IP) address, or identification number to the wireless smart device that triggers either a wallet application or a web browser in the wireless smart device to access the section of the merchant's website specific to the good or service.

10. The method of claim 9, wherein the providing an option for the potential purchaser to purchase the good or service includes transmitting data to the wireless smart device that enables either the wallet application or the web browser to display an on-line store purchasing interface.

11. A system for facilitating the use of a wireless smart device to purchase goods or services, the system comprising;
a smart poster located in an area of a retail location associated with a merchant that is accessible by a potential purchaser of a good or service, wherein a purchase transaction of the good or service is initiated by interfacing a wireless smart device with the smart poster using near field communications (NFC), wherein the wireless smart device receives an identification number from the smart poster via the NFC; and
a mechanism in or on the smart poster for directing the wireless smart device to utilize the identification number obtained from the smart poster to access a section of the merchant's website specific to the good or service advertised by the smart poster, wherein the wireless smart device conducts the purchase transaction of the good or service at the retail location in a manner that bypasses the point of sale terminal at the retail location, wherein the wireless smart device is further configured to provide electronic payment information that is pre-stored in the wireless smart device to an on-line purchasing system associated with the retail location.

12. The system of claim 11 wherein the smart poster is located in a retail establishment.

13. The system of claim 11 wherein the smart poster is located outside of a retail establishment.

14. The system of claim 11 comprising a wallet application located on the wireless smart device for completing the purchase transaction.

15. The system of claim 14 wherein the wallet application has access to a soft card stored on the wireless smart device to pay for the good or service.

16. The system of claim 11 wherein the smart poster is configured to provide a coupon to the wireless smart device in response to receiving communications from the wireless smart device.

17. The system of claim 11 wherein the wireless smart device comprises a near field communications (NFC) enabled user device and wherein the mechanism in or on the smart poster includes an NFC transceiver and a product information/purchase module for communicating information to the wireless smart device via near field communications for directing the wireless smart device to the section of the merchant's website specific to the good or service.

18. The system of claim 11 wherein the wireless smart device comprises a radio frequency (RF) enabled user device and wherein the mechanism in or on the smart poster includes an RF transceiver and a product information/purchase module for communicating information to the wireless smart device via near field communications for directing the wireless smart device to the section of the merchant's website specific to the good or service.

19. The system of claim 11 wherein the smart poster enables purchase of the good or service when the good or service is not available for purchase at the purchaser's current location.

20. The system of claim 11 wherein the mechanism is configured to provide at least one of a URL, an Internet protocol (IP) address, identification number to the wireless smart device that triggers either a wallet application or a web browser in the wireless smart device to access the section of the merchant's website specific to the good or service.

21. The system of claim 11 wherein the merchant's website is configured to provide an option for the potential purchaser to purchase the good or service includes transmitting data to the wireless smart device that enables either the wallet application or the web browser to display an on-line store purchasing interface.

22. A non-transitory computer readable medium having stored thereon computer executable instructions that when executed by a processor of a computer control the computer to perform steps comprising:
at a retail location associated with a merchant that includes a point of sale terminal and a smart poster that advertises a good or service:
initiating a purchase transaction selection of the good or service by interfacing a wireless smart device with the smart poster using near field communications (NFC), wherein the wireless smart device receives an identification number from the smart poster via the NFC, wherein the smart poster is located in an area of the retail location that is accessible by a potential purchaser of the good or service;
directing, using a mechanism in or on the smart poster, the wireless smart device to utilize the identification number obtained from the smart poster to access a section of the merchant's website specific to the good or service in response to the wireless smart device interfacing with the smart poster; and
conducting, via the wireless smart device, the purchase transaction of the good or service at the retail location in a manner that bypasses the point of sale terminal at the retail location, wherein conducting the purchase transaction includes providing electronic payment information that is pre-stored in the wireless smart device to an on-line purchasing system associated with the retail location.

* * * * *